United States Patent
Uhlmann et al.

(10) Patent No.: US 7,418,619 B1
(45) Date of Patent: *Aug. 26, 2008

(54) BACKUP AND RESTORE OPERATIONS OF INTERDEPENDENT SYSTEM COMPONENTS

(75) Inventors: Carolina P. Uhlmann, Seattle, WA (US); Eric A. Herrmann, Snohomish, WA (US); Dianne C. Thompson, Bellevue, WA (US); Janet L. Schneider, Bellevue, WA (US); Patrick M. Simonich, Kent, WA (US)

(73) Assignee: EMC Corporation, Hopkinton, MA (US)

( * ) Notice: Subject to any disclaimer, the term of this patent is extended or adjusted under 35 U.S.C. 154(b) by 560 days.

This patent is subject to a terminal disclaimer.

(21) Appl. No.: 10/978,025

(22) Filed: Oct. 29, 2004

Related U.S. Application Data

(63) Continuation-in-part of application No. 10/935,551, filed on Sep. 7, 2004, now Pat. No. 7,346,799, and a continuation-in-part of application No. 10/935,552, filed on Sep. 7, 2004.

(51) Int. Cl.
*G06F 11/00* (2006.01)
(52) U.S. Cl. .............................. 714/2; 714/6
(58) Field of Classification Search ............. 714/2, 714/6, 13, 15, 16, 20, 5; 707/202, 204
See application file for complete search history.

(56) References Cited

U.S. PATENT DOCUMENTS

| | | | |
|---|---|---|---|
| 6,865,655 B1 | 3/2005 | Andersen | |
| 6,910,112 B2* | 6/2005 | Berkowitz et al. | 711/162 |
| 6,948,038 B2* | 9/2005 | Berkowitz et al. | 711/162 |
| 7,162,599 B2* | 1/2007 | Berkowitz et al. | 711/162 |
| 2003/0182301 A1 | 9/2003 | Patterson et al. | |
| 2004/0010487 A1* | 1/2004 | Prahlad et al. | 707/1 |
| 2004/0236916 A1 | 11/2004 | Berkowitz et al. | |
| 2004/0250033 A1 | 12/2004 | Prahlad et al. | |
| 2005/0015663 A1 | 1/2005 | Armangau et al. | |
| 2005/0028022 A1 | 2/2005 | Amano | |
| 2005/0081099 A1 | 4/2005 | Chang et al. | |
| 2006/0053332 A1 | 3/2006 | Uhlmann et al. | |
| 2006/0053333 A1 | 3/2006 | Uhlmann et al. | |
| 2007/0005914 A1 | 1/2007 | Thompson et al. | |
| 2007/0005915 A1* | 1/2007 | Thompson et al. | 711/162 |
| 2007/0006017 A1 | 1/2007 | Thompson et al. | |
| 2007/0006018 A1 | 1/2007 | Thompson et al. | |

OTHER PUBLICATIONS

How Veritas Storage Foundation TM for Windows Integrates with and Enhances Windows Server 2003 Volume Shadow Copy Service. Veritas Software Corporation. Nov. 20, 2003.

(Continued)

*Primary Examiner*—Dieu-Minh Le
(74) *Attorney, Agent, or Firm*—Workman Nydegger

(57) ABSTRACT

Systems and methods for backing up or restoring interdependent applications. During a backup or recovery process, the writers and writer components included in the backup groupings of a client are displayed. Some of the writers and writer components can be individually selected for backup or recovery. Some of the writer components may have a dependency on a writer component in another writer. The dependency is automatically selected, although a user can disable the automatic selection of the dependency or deselect the dependency. The dependency is then backed up or recovered along with the selected writers and selected writer components.

32 Claims, 6 Drawing Sheets

OTHER PUBLICATIONS

Legato NetWorker Administrator's Guide Release 6.0. Legato Systems, Inc. Aug. 2000. pp. 276, 312, 502.

Paragon Drive Backup Enterprise Server Edition, Best Practices for MS Exchange Server. [retrieved on Aug. 8, 2007 from the Internet] <URL:http://download.paragon-software.com/doc/Best_Practices_MS_Exchange_Server.pdf>.

Veritas Backup Exec 9.1 for Windows Servers. Veritas Software Corporation. Jan. 21, 2004.

Sankaran, Guinn, Nguyen. "Volume Shadow Copy Service Helps Build an Integrated Backup System". Power Solutions. Mar. 2004.

Symantec Backup Exec Quick Recovery and Off-Host Backup Solutions. Symantec. Jan. 2007.

Quick Recovery for Microsoft Exchange 2003 using Veritas Storage Foundation for Microsoft Windows and HP Storage—white paper. Hewlett-Packard Development Company, L.P. Sep. 2004.

Why Windows Storage Server 2003 for your NAS Solution? Microsoft Corporation 2002.

Backup and Restore Technologies. Jun. 18, 2003 [retrieved on Aug. 8, 2007]. Retrieved from the Internet <URL:http://searchwincomputing.techtarget.com/searchWinSystems/downloads/Naik_ch05.pdf>. pp. 137-173.

Sun StorEdge Enterprise Backup Software 7.1 Administrator's Guide. Legato Systems, Inc. Sep. 2003. pp. 1-2.

Veritas Storage Foundation 4.0 for Windows Solutions Guide Windows Server 2003. Veritas Software Corporation 2003. pp. 1-2.

Veritas Storage Foundation 4.1 for Windows Solutions Guide Windows 2000, Windows Server 2003. Veritas Software Corporation 2004. pp. 1-2.

Veritas Storage Foundation 4.1 for Windows Administrator's Guide Windows 2000, Windows Server 2003. Veritas Software Corporation 2004. pp. 1-2.

Veritas Storage Foundation 4.1 for Windows Solution's Guide for Microsoft Exchange Server Windows 2000, Windows Server 2003. Veritas Software Corporation May 2004. pp. 1-2.

How Volume Shadow Copy Service Works. Microsoft Corporation. [retrieved on Aug. 8, 2007] Retrieved from the Internet <URL:http//technet1.microsoft.com/windowsserver/en/library/2b0d2457-b7d8-42c3-b6c9-59c145b7765f1033,nsox?mfr=true>. Mar. 28, 2003.

Use of Components by the Requester (Windows). Microsoft Corporation. [retrieved on Aug. 8, 2007] Retrieved from the Internet <URL:http://msdn2.microsoft.com/en-us/library/aa384628.aspx>. Jul. 2, 2007.

IVssBackupComponents::AddComponent. Microsoft Corporation. [retrieved on Aug. 8, 2007 from the Internet] <URL:http://msdn2.microsoft.com/en-us/library/aa382646.aspx>. Jul. 2, 2007.

Overview of Actual File Restoration. Microsoft Corporation. [retrieved on Aug. 8, 2007 from the Internet] <URL:http://msdn2.microsoft.com/en-us/library/aa384575.aspx>. Jul. 2, 2007.

Overview of Actual Backup Initialization. Microsoft Corporation. [retrieved on Aug. 8, 2007 from the Internet] >URL:http://msdn2.microsoft.com/en-us/library/aa384577.aspx>. Jul. 2, 2007.

Overview of Processing a Restore under VSS. Microsoft Corporation. [retrieved on Aug. 8, 2007 from the Internet] <URL: http://msdn2.microsoft.com/en-us/library/aa384590.aspx>. Jul. 2, 2007.

Writer Metadata Document Life Cycle. Microsoft Corporation. [retrieved on Aug. 8, 2007 from the Internet] <URL:http://msdn2.microsoft.com/en-us/library/aa384998.aspx>. Jul. 2, 2007.

Overview of Restore Initialization. Microsoft Corporation. [retrieved on Aug. 8, 2007 from the Internet] <URL:http://msdn2.microsoft.com/en-us/library/aa384592.aspx>. Jul. 2, 2007.

Microsoft Windows Server 2003. Introduction to Shadow Copies of Shared Folders. Microsoft Corporation. Mar. 2003. 15 Pages.

Microsoft Windows Server 2003. Windows Server 2003 Active Directory Fast Recovery with Volume Shadow Copy Service and Virtual Disk Service. Microsoft Corporation. Aug. 2003. 16 Pages.

Microsoft Windows Storage Server 2003. NSI Software. NSI solutions with Microsoft VSS. Microsoft Coporation. Mar. 2004. 8 pages.

Office Action mailed Jun. 1, 2007 for U.S. Appl. No. 11/170,015.

Office Action mailed Jun. 1, 2007 for U.S. Appl. No. 11/169,853.

Office Action mailed Sep. 7, 2007 for U.S. Appl. No. 11/169,418.

Office Action mailed Sep. 7, 2007 for U.S Appl. No. 11/169,419.

Office Action mailed Aug. 14, 2007 for U.S. Appl. No. 10/935,551.

* cited by examiner

BACKUP AND RESTORE OPERATIONS OF INTERDEPENDENT SYSTEM COMPONENTS

CROSS-REFERENCE TO RELATED APPLICATIONS

This application is a continuation-in-part application of U.S. application Ser. No. 10/935,551, filed Sep. 7, 2004, and a continuation-in-part-application of U.S. application Ser. No. 10/935,552, filed Sep. 7, 2004, which applications are hereby incorporated by reference.

BACKGROUND OF THE INVENTION

1. The Field of the Invention

The present invention relates to systems and methods for backing up or recovering the data of a computer system. More particularly, embodiments of the invention relate to systems and methods for backing up or recovering data that includes applications with dependencies on other applications.

2. Background and Relevant Art

Because of our dependence on computer networks and on computers themselves, a premium is placed on the availability and reliability of data. For many corporate enterprises, essentially all corporate data is stored on a computer network and access to the data is expected at any time. The demand for uninterrupted access to data corresponds to a need for software and hardware that can meet the demand to provide data and services. At the same time, the demand for access to data and the quantity of data has made it increasingly difficult to protect the data from events such as system failures, viruses, power outages, etc.

In view of these potential problems, it is imperative that the data be protected. This is typically accomplished through the use of software that backs up the data and that recovers the data from the backup copy when necessary. As the amount of data continues to increase, backing up and recovering the data becomes more complex. Large amounts of data cannot be quickly transferred from one volume to a backup volume and taking a volume of data offline for backup purposes is an unattractive option.

It is often necessary to also back up other types of data such as applications and services. However, applications and services often have open files when a backup is initiated. Open files generally cannot be effectively backed up using conventional systems, and are often skipped during backup operations. As a result, additional applications are often needed to help manage backups of open files and to administrate backup logs for files that were skipped during backup.

Certain applications including operating systems present another challenge to software and systems that back up data. The complexity of these applications often requires that they be backed up as a logical unit to preserve the state of the application or client. A partial backup of, for example, an operating system may result in inconsistencies or system failure if the operating system is restored from a partial or incomplete backup. In other words, backing up the file system itself does not effectively back up the state of the system and may result in errors when recovered. Operating systems and other applications are often used with databases or other volumes of data that need to be backed up in order to preserve the state of the system. In addition, operating systems as well as applications and services are often distributed across computer systems, a fact that complicates an effective backup and recovery of the data.

Applications and services present another problem as well during backup or recover operations. For example, an application may rely on data that is not part of the application itself or that is part of another application. Many systems, for example, include databases that are used by various applications but are not part of the applications themselves. Backing up the application without backing up the corresponding database may not result in a reliable backup because the application is dependent on the database. In other words, failure to backup the database on which the application relies during backup of the application itself is often unacceptable because of the dependency of the application on the database.

BRIEF DESCRIPTION OF THE DRAWINGS

In order to describe the manner in which the advantages and features of the invention can be obtained, a description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Embodiments of the present invention relate to systems and methods for selectively backing up and/or recovering data. Embodiments of the invention enable applications to be backed up or recovered in a manner that preserves their state even when the applications rely on data that is not directly associated with the application being backed up or recovered.

In a typically situation, a server computer is configured to perform or initiate scheduled backup operations of various clients (recover operations typically occur only when necessary). The data of a client being backed up is typically organized into backup groupings. Each backup grouping corresponds to data that is to be backed up. Each backup grouping may include one or more writers, which are a module or code that ensures that the corresponding data or application is ready for the backup operation. Each backup grouping may include more than one writer and each writer may have more than one writer component. In addition, there are certain writers that may have a dependency on a writer component in another backup grouping or even within the same backup grouping. Embodiments of the invention enable the individual selection of writers or of writer components as well as providing systems and methods for backing up data associated with writer dependencies.

Embodiments of the invention allow a user to backup and recover individual writers and writer components. In some instances, the selectability of writers may be determined by a type of a writer. For example, the type of writers in a particular backup grouping may require that all writers in the backup grouping or in a set of backup groupings be backed up together to preserve a consistent state. Certain backup groupings that correspond to critical portions of the operating system, for example, should be backed up together.

1. Overview of Exemplary Systems for Backing Up Data

Figure 1A:
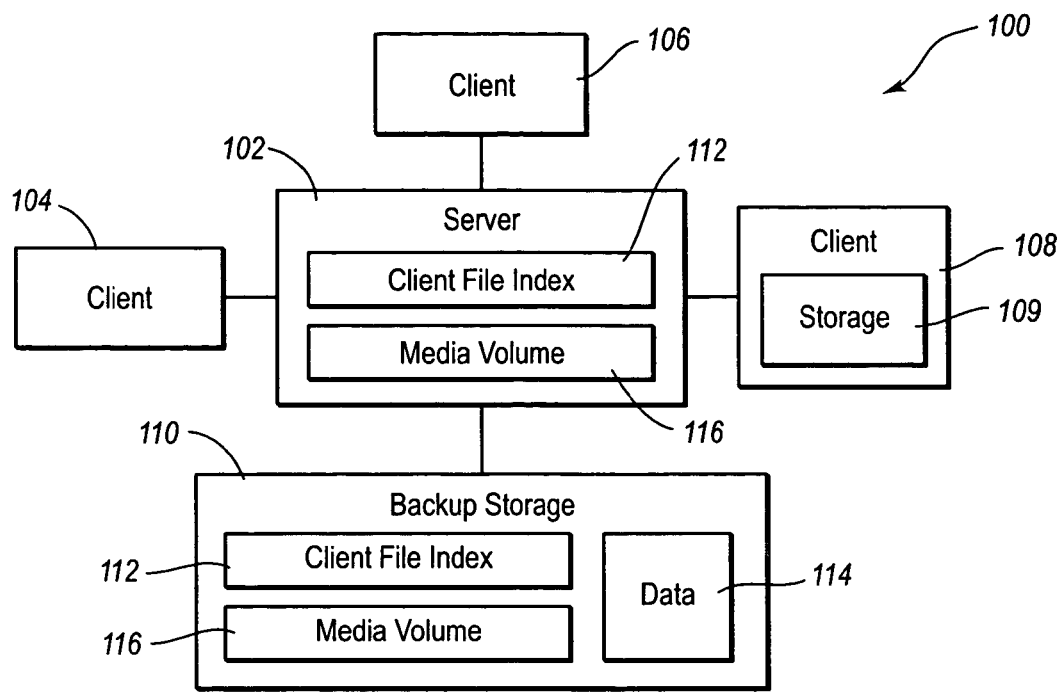
FIG. 1A illustrates an exemplary environment for implementing embodiments of the invention.
Figure 1B:
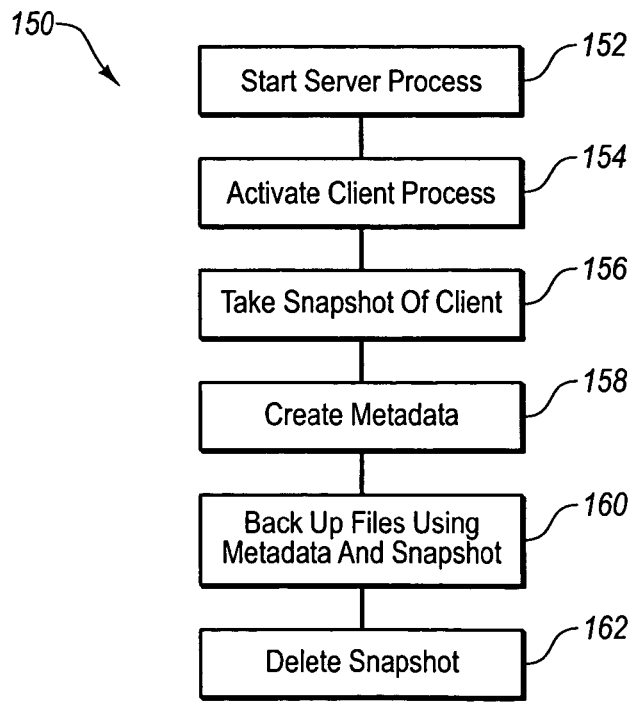
FIG. 1B illustrates an exemplary method for backing up the data of a client system.

FIGS. 1A and 1B illustrate an exemplary system for implementing embodiments of the invention as well as an exemplary method for backing up a client. FIG. 1A illustrates an exemplary system for backing up or recovering a computer system or network data that can be adapted for use with the invention. FIG. 1A illustrates a server 102 that has a relationship with client(s) that are represented by the clients 104, 106, and 108. Each client 104, 106, and 108 may have data on a storage volume that is local and/or remote with respect to the respective client. The storage volume represents one or more volumes or drives of the client as well as applications and services. The client 108, for instance, has storage 109 that contains data (including applications, services, and/or volumes). Also, services represent a type of application and may therefore be referred to as applications herein.

Each client 104, 106, and 108 represents a system with data to be backed up. Each client can be relatively simple (e.g., a desktop computer) or relatively complex (e.g., a large database server or a cluster of servers). The client may further be a network or a storage area network (SAN). Each client 104, 106, and 108 may also operate under a different operating system or platform than the server 102. In the context of a backup operation, the server 102 typically initiates the backup operation. The server 102 initiates the scheduled backup operations for the client.

A user may establish a schedule that defines the times at which the server 102 automatically performs a backup operation on the data of clients 104, 106, and/or 108. The server 102 can also be a client and can be backed up as well. However, users on the clients can also initiate ad hoc backup operations and recover operations. In the example of FIG. 1A, the server 102 has access to backup storage 110 where copies of the client's data is stored. The backup storage 110 can be integrated with the server 102 or may be distinct and separate from the server 102. The data 114 represents the data of the clients 102, 104, and 106 that has been backed up by the server 102 on the back up storage 110. One of skill in the art can appreciate that the server 102 can also backup and/or recover itself. The server can therefore be a client in this context as well as the server. Thus, the storage 110 may include a backup of the server 102.

The server 102 typically controls and directs all server initiated backup operations or processes. The client controls ad hoc backup and recover operations. Data is backed up, in one embodiment, using backup groupings. Each backup grouping is a collection of data or items that are backed up during a backup session between the server 102 and a particular client or clients. A backup grouping can therefore include a group of files, an entire file system, application-generated data such as a database or operating system information, and the like. A backup grouping may also include applications or services or components of applications, services, and/or operating systems. As described below, a backup grouping may include one or more writers, each corresponding to at least one application or service. The data associated with writers in a backup grouping may further be located in different directories, different volumes, and the like.

In certain types of applications, such as operating systems, it is strongly recommended that the critical components of the operating system be backed up and recovered as a consistent unit. In other words, an operating system may include files or databases that define the state of the client or system at any given time. Simply backing up contents of the file system may not capture the state of the client, as previously explained. When the server 102 performs a backup of a client, it usually ensures that the appropriate backup groupings associated with the operating system are backed up at the same time or together to ensure that the operating system is backed up as a consistent unit and that the state of the client or system is preserved in the backup of the data. A client may include other applications or services, in addition to the operating system specific applications and services, that also have components that should be backed up as a consistent unit.

The server 102 also stores and manages a client file index 112 and a media volume 116 both on the server itself and on the backup storage 110. The client-file index 112 is an index of the backed up data items. The media volume 116 is an index of the backup volumes. The client file index 112 and the media volume 116 are collectively referred to herein as the "online indexes". The online indexes are typically stored on the backup storage 110 after the backup operation is complete.

FIG. 1B provides a general overview of a server initiated backup operation. At the server, a server backup process is started 152. The server process then activates a client process 154. Based on the backup groupings selected for backup, the volumes to be included in the backup are identified and a snapshot of the client 154 is performed. As the snapshot is created, a metadata document is created 158.

Next, the files or data to be backed up are identified from the metadata document and the backup operation is performed using the metadata document and the snapshot 160. After the backup operation is completed, the snapshot is typically deleted 162.

Figure 2:
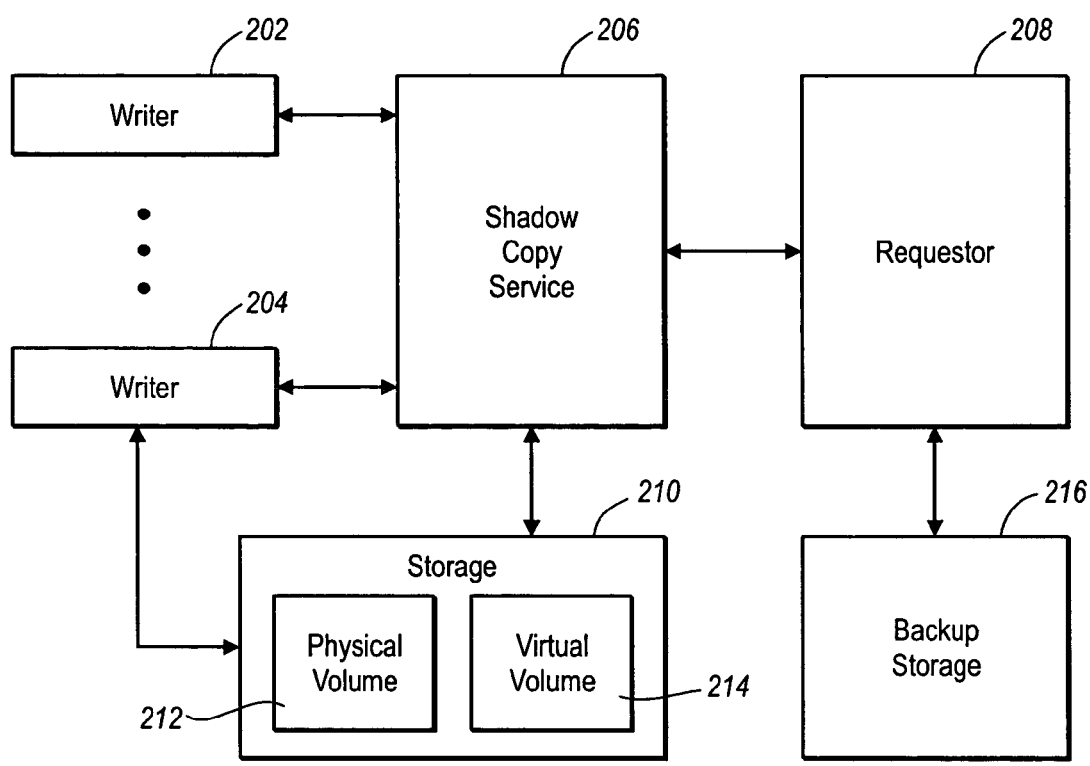
FIG. 2 illustrates an exemplary system for using writers to backup the data of a client system.

The method of FIG. 1B is more fully described with reference to FIG. 2, which illustrates an exemplary system for backing up and/or recovering data that operates according to embodiments of the invention. As previously stated, applications included in backup groupings are typically associated with a writer. Each writer in FIG. 2, represented by the writers 202 and 204, is thus associated with at least one application or service and at least one backup grouping. During a backup process, the writers provide metadata that includes the writer's name, items or data such as files and components to back up, what items or data are to be excluded from the backup, and/or the methods for handling components and applications during backup and restore. The writers 202, 204 also identify the type of application or service that is being backed up.

A writer may be associated, for example, with a mail server, a database, an operating system, or other application or data store. Although embodiments of the invention can be implemented in connection with substantially any operating systems and computers that provide writers or similar functionality, one example of an operating system that employs writers is Windows 2003 and later Windows versions available from Microsoft Corporation of Redmond, Wash.

In FIG. 2, the shadow copy service 206 is an operating system service that participates in the generation of a shadow copy (also referred to herein as a snapshot or as a virtual volume) of a particular set of data or volume. In one example, the virtual volumes are generated for a particular backup grouping. As other backup groupings are processed, additional virtual volume(s) are generated as required. In another example, multiple backup groupings are processed together and a single snapshot (which may include one or more virtual volumes) is generated to backup the backup groupings. Thus, a virtual volume may be created for each backup grouping, each writer, or a group of backup groupings or writers. The requester 208 (which, in one embodiment, is a backup process or a recover process operating on the client or server) typically initiates a backup operation by querying the service 206 to obtain the needed information for the backup operation from the writers 202, 204. The writers 202, 204 generate the metadata and the requestor 208 receives the metadata from the shadow copy service 206. The metadata is typically saved by the requestor 208 before backing up the items or data identified in the metadata.

In this example, the physical volume 212 corresponds to the data identified in at least one of the backup groupings of the requestor 208. As the backup process continues, the writer may prepare the application for backup. This ensures that the physical volume, as well as the application, is in a consistent state. The writer may prepare the application (or service) for backup, for example, by preventing new transactions from occurring, finishing existing transactions, and flushing any cache to disk or to the physical volume 212. After a consistent copy is stored in the physical volume 212, a virtual volume 214 is created.

The virtual volume 214 is typically a snapshot of the physical volume. After the virtual volume 214 is completed, the application is released and can continue operation. The requestor 208 then performs the backup operation from the virtual volume 214.

More specifically, the requestor 208 asks the service 206 to identify the writers 202, 204 and to gather the metadata from the writers. In one embodiment, the service 206 only identifies active writers. The shadow copy service 206 provides metadata from the writers 202, 204 to the requestor 208 and the metadata includes an XML description of the backup components and the restore method. A writer XML file associated with each writer include information relating to the individual selectability criteria of the writer components. For example, the metadata or writer XML file may indicate that some of the writer components should be selected together for backup or recovery based on the selectability criteria and the component dependencies specified by the writer. In another example, some writer components may be individually selectable for recover, but may not be individually selectable for backup. Through the service 206, the requestor 208 can identify which volumes support a shadow copy for the volumes required by the XML description in the metadata.

Through the service 206, the writers freeze the activity of the corresponding applications and the requestor 208 then instructs the service 206 to create shadow copies (virtual volumes). After the snapshot(s) are completed, the writers may resume activity. A backup copy of the items identified in the backup groupings is then made from the one or more virtual volumes. After the backup is complete, the virtual volume(s) may be deleted.

2. Backup Groupings Used with Application Writers

Figure 3:
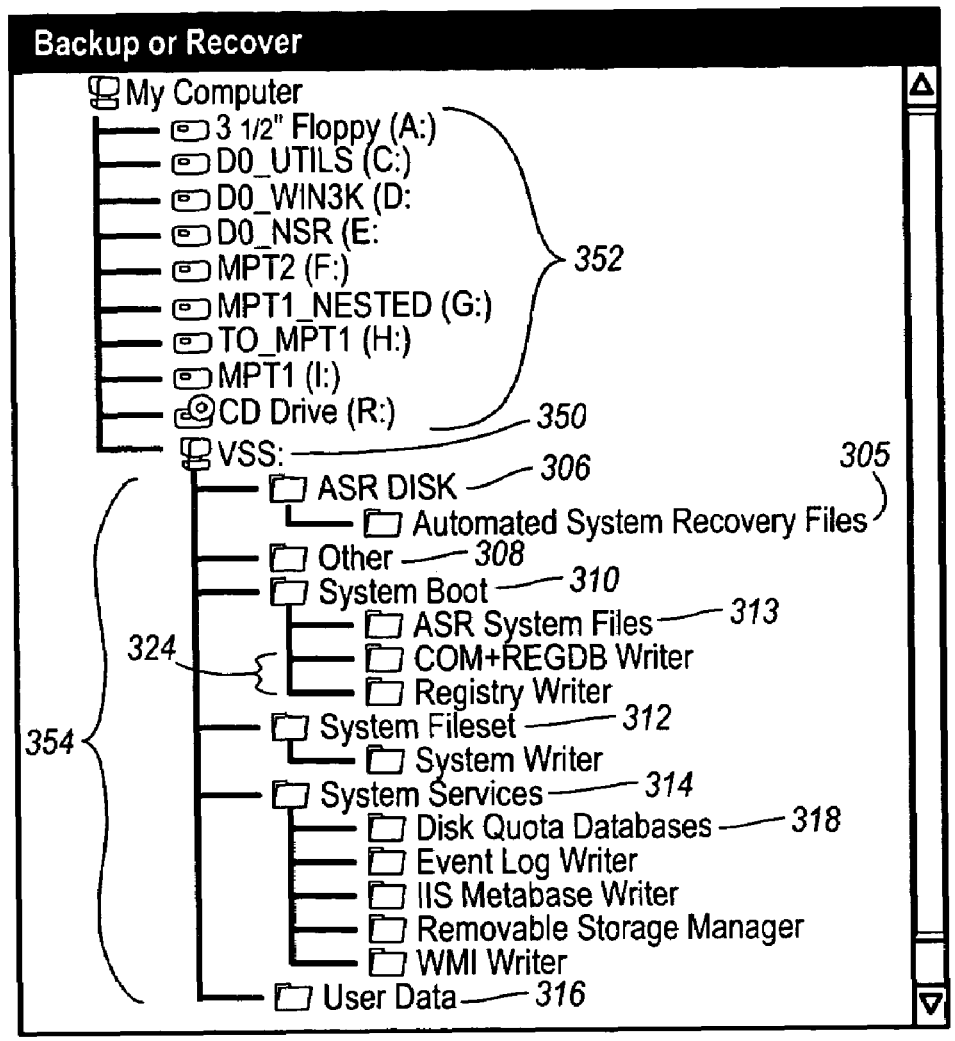
FIG. 3 illustrates the organization of backup groupings of a client system.

FIG. 3 further illustrates the concept of backup groupings for both backup and recover operations as well as the relationship between writers and backup groupings. FIG. 3 illustrates the backup groupings of a client. One of skill in the art can appreciate that the backup groupings can be arranged in other hierarchical configurations. In FIG. 3, the backup groupings 354 are arranged under a tree 350.

The backup groupings 354 in the tree 350 typically include applications or services that may be associated with a writer. This is one reason they are grouped under the tree 350. The backup groupings 352 are not associated with corresponding writers. In this example, writers 324 populate the backup grouping 310. The component 313, however, which is also included in the backup grouping 310 along with the writers 324, does not have a writer in this example. Other components in other backup groupings, such as the component 305 and the component 318, do not have a writer in one example. These components are backup up together with the corresponding writers of the backup grouping to ensure that the backup grouping is backed up as a consistent unit. For example, all of the components and writers in the backup grouping 310 are backed up together even though the component 313 is not associated with a writer.

With reference to the backup groupings 354, the backup groupings 306, 308, 310, 312, 314, and 316 are system backup groupings and may include operating system writers. Because many writers of the system backup groupings 354 have interdependencies, it is preferable to back up all of the system's backup groupings at the same time. This ensures that the client can be restored in a consistent manner should restoration be required. In one example, at least the backup groupings 310, 312, and 314 should be backed up together in this example.

3. Individual Selectability of Backup Groupings, Writers, and Writer Components

Figure 4:
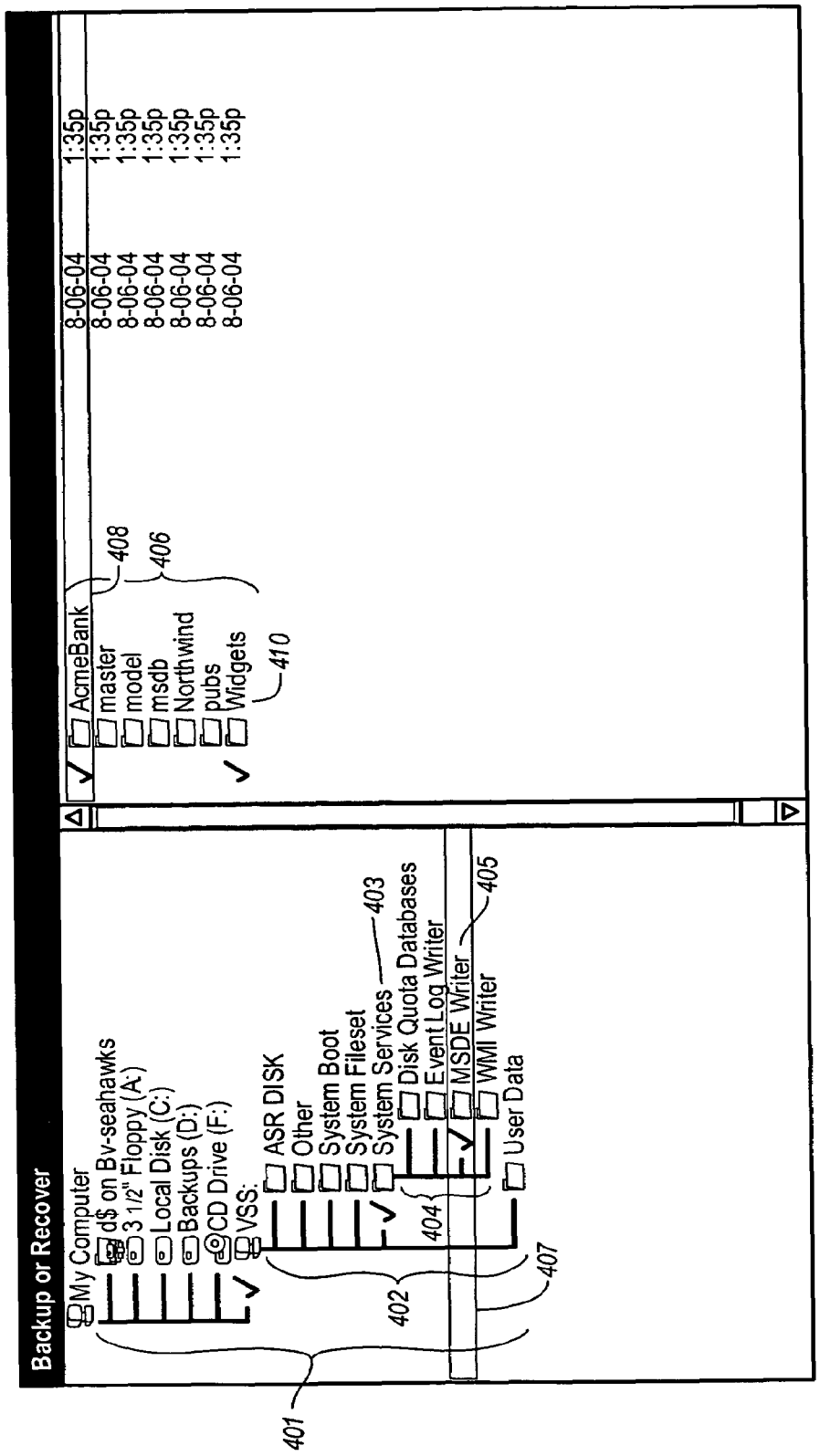
FIG. 4 illustrates an example of the selectability of writers and the selectability of writer components in a backup grouping.

FIG. 4 illustrates an example of the selectability of a writer as well as the selectability of writer components. In addition, backup groupings can also be individually selectable. The user interface 400 illustrates the selectability of writers and writer components for a backup operation. The tree 401 includes the backup groupings 402. In this example, the backup grouping 403 has been selected for backup (as indicated by the check). More particularly, the backup grouping 402 includes the writers 404. Of the writers 404, the writer 405 has been selected for backup.

When the bar 407 highlights a backup grouping or a writer, then the corresponding writer components are displayed in the interface 400. In this example, the writer 405 is selected and the writer components 406 are displayed to the user. The user has the option of selecting one or more of the writer components 406 for backup. The individual selectability of the writer components is controlled by the corresponding writer. In this case, the writer components 408 and 410 have been selected.

The selectability of the writers in a particular backup grouping can occur in both backup and recover operation. In some cases, it is advisable to select all of the writers in a backup grouping in order to ensure that the state of the client is preserved in the backup copy. The selectability of the writer components may be determined by the writer. Alternatively, the user can select which writer components to back up.

The selectability of a writer or of a writer component can be visually indicated to a user. For example, a check box or other icon or visual representation can be presented next to each writer or writer component.

4. Writer Component Dependency

Writers may also specify dependencies for its own writer components on writer components within other writers. When a writer component with a dependency is selected for backup or recovery, the dependency (which is typically a writer component) may also be selected. For example, an application is associated with a database. In order to recover the application, it may be necessary to save the database as well. Thus, a backup of the application should also include a backup of the database in order to be recovered properly.

Failure to backup the database may result in a failed recovery of the application because the application depends on the database.

Figure 5:
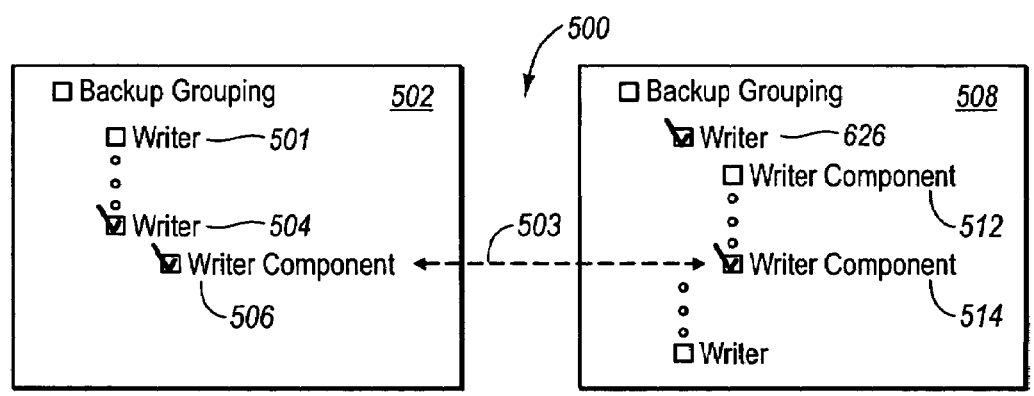
FIG. 5 illustrates an example of a writer that has a dependency with another writer in another backup grouping.

In this example, writer of the application specifies a dependency on the writer that is associated with the database. More particularly, the writer component of the application has a dependency on a writer component of the database's writer. This is illustrated in FIG. 5, which illustrates the backup groupings of a client and the dependency of a writer. In this example, the backup grouping 502 has been selected for backup. More specifically, the writer 504 and the writer component 506 have been selected for backup while the writer 501 is unselected. This illustrates the selectability of writers in the backup grouping 502.

The writer component 506 has a dependency, illustrated by the line 503, on the writer component 514. Thus, when the writer component 506 is selected by a user, the writer component 514 may be automatically selected for backup as well. Typically, the user is advised of this fact by a pop-up window that explains the relevance of the writer dependency. The user still has the option of deselecting the writer component 514. For example, the writer component 514 may correspond to a large database. If the user knows that the database has not changed, then the user may choose to deselect the writer component 514, which is a dependency of the writer component 506. This can improve performance of the backup operation. During a recovery, the user may also choose to not recover the dependency.

The occurrence of a writer dependency can exist in both backup and recover operations. The ability to deselect a dependent writer provides a user with more control over the backup or recover operation. The backup process can be configured to disable or ignore dependencies. This is often useful when the backup is initiated from a command line using the appropriate syntax.

Figure 6:
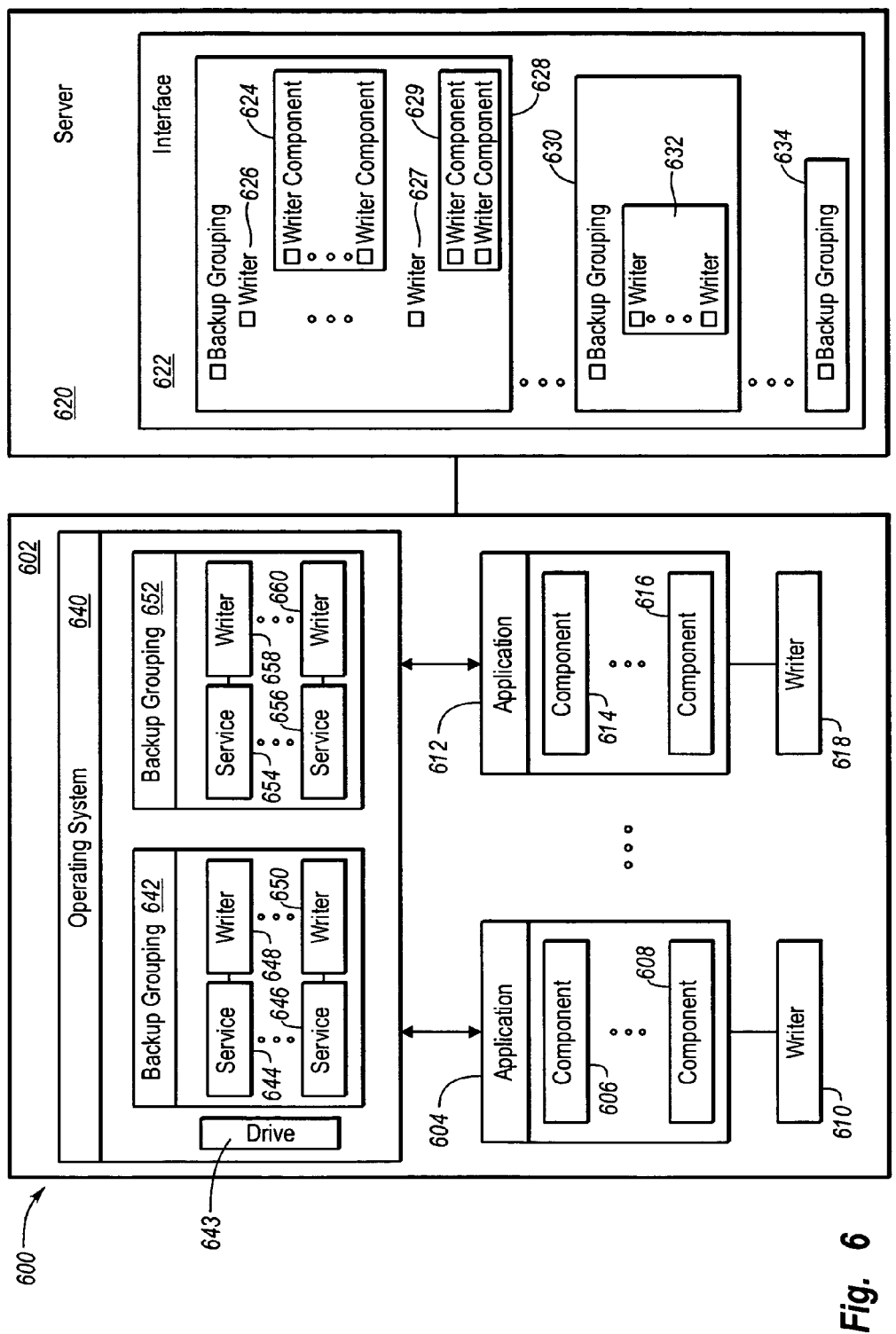
FIG. 6 illustrates an example of backup groupings on a client and the individual selectability of the writers and the writer components from a server.

5. Backup Groupings with Selectable Components for Backup and Restore Operations FIG. 6 is a block diagram further illustrating the selectability of writers and/or writer components for both backup operations and restore operations. In one example, the selectability of writers and writer components is not random. The writer, for example, may determine which components are independently selectable and which components cannot be selected independently. The writer may require that certain components be selected together. The writers in a particular backup grouping may not be individually selectable while the writers in another backup grouping are individually selectable for both backup and recover operations. The interfaces shown for backup and recover operations may optionally include icons that visually indicate to a user whether a writer or a writer component is individually selectable for backup or recovery.

Selectable backup groupings enable the server to adapt to changes in the requirements for backing up operating systems as well as other applications and service. In a similar manner, writers and writer components of a backup grouping or of an application can be selected for backup or recovery. FIG. 6 also illustrates that the backup operation or recover operation performed by the server 620 is customizable and can backup/restore other types of databases, services, applications, data, etc., that are not part of the system state.

In this example, the client 602 includes an operating system 640, an application 604 (representative of multiple non operating system applications), and a service 612 (representative of multiple non operating system services). The operating system 640 is illustrated in terms of backup groupings and an operating system drive. In this example, the backup grouping 642 and the backup grouping 652 should be backed up together and recovered together to preserve the state of the client's system. The operating system drive 643 is typically included as well with the backup groupings 642 and 652.

The backup grouping 642 includes one or more services represented by the services 644 and 646. The backup grouping 652 includes one or more applications represented by the applications 654 and 656. One of skill in the art can appreciate that a backup grouping can include both services, applications, and/or other data. Some services and applications in the backup groupings 642 and 652 have an associated writer. As previously discussed however, some applications or services may not have a corresponding writer. The service 644 is associated with the writer 648, the service 646 with the writer 650, the application 654 with the writer 658, and the application 656 with the writer 660.

When the writers are enumerated, the backup server 620 becomes aware of the writers 648, 650, 658, 660, 610, and 618, which are all active writers in this example. As illustrated, the writers 648 and 650 have a particular type that places them in the backup grouping 642. For example, the backup grouping 628 illustrated in the interface 622 may correspond with the backup grouping 642 illustrated in the client 602.

FIG. 6 also illustrates the application 604 which has components 606 and 608, and the service 612 which has the components 614 and 616. The application 604 is associated with the writer 610, and the service 612 is associated with the writer 618. Each writer can suspend and enable the operation of the corresponding application, service, or components thereof during backup and, if necessary, during recovery.

As previously described, the requestor uses the shadow copy service to enumerate the writers 610, 618, 648, 650, 658, and 660 when a backup operation is initiated. These writers are active in this example and discovered by the backup process dynamically by querying the shadow copy service. In one embodiment, some of the content of the backup groupings may already be known to the backup process and do not need to be discovered.

Each writer is aware of the items or data that should be backed up for the associated application or service. For example, the writer 610 understands that the items to be backed up for the application 604 may include the component 606 and the component 608. The writer 610 may also identify items or components that can be individually selected for backup or recovery. The writer 610 may also identify items or components that need to be selected together for backup or recovery. Embodiments of the invention also enable individual selection of writers or writer components when the writer component(s) have a nested hierarchical relationship. In this case, dependencies can be selected within the hierarchical relationships. In addition, some of the writer components that are backed up together may not need to be recovered together. This information is typically provided to the backup and recover processes in a particular format, such as XML.

The server 620 can generate a user interface represented by the interface 622 that enables a user or administrator to select fewer than all of the writers and/or their components for backup and recover operations. For illustration purposes, the interface 622 displays backup groupings 628, 630, and 634. The backup grouping 628 includes the writer 626 and the writer 627. The writer 626 is associated with the writer components 624 and the writer 627 is associated with the writer components 629.

A checkbox is displayed by each backup grouping, writer, and writer component in the interface 622 and a user can check the checkboxes to select which backup groupings, writers, and/or writer components should be backed up and/or recovered. In one example, a visual indication such as an icon may be displayed if selectable backup/recovery is supported by the writer for a particular writer component or group of writer components. In other words, a user may not be permitted to select individual components for backup and/or recover when not supported by the writer. This gives the backup process and the recover process the ability to control the data that is backed up or recovered.

For example, through the interface 622, a user may select to backup only the backup grouping 642 of the operating system 640. As previously stated, it is often advisable to back up the operating system 640 as a logically consistent unit. This may require the selection of multiple backup groupings. Each backup grouping of the operating system 640 may be associated with more than one writer or with a different writer.

Certain backup groupings of the operating system 640 should be backed up all together in order to preserve the state of the client 602. At recover time, a warning may be issued to the user when the appropriate backup groupings are not all selected together or when a recommended backup grouping, writer, or writer component for a recovery is not selected. For example, if the backup grouping 628 and the backup grouping 630 (which correspond to the backup groupings 642 and 652) should be recovered together to restore the state of the client 602 and only the backup grouping 628 is selected, the recover process may advise the user that the backup grouping 630 should also be selected. However, the recover process may not prevent the user proposed recover operation from proceeding.

Thus, the backup and recover processes enable fewer than all of the backup groupings containing writers for a particular system to be backed up or recovered. In some instances, the state of the client can be preserved even when some of the components of the operating system are not selected. The operating system may be associated with some backup groupings that are not necessarily required to preserve the state of the system or client. This can result in improved performance by selectively backing up and/or recovering selected backup groupings or portions of backup groupings of the client 602 without risking that the state of the client is unprotected or inconsistent.

The interface 622 may also be used to initiate a recover operation. Because the operating system is typically backed up as a logical unit, the operating system is usually recovered as a unit. As previously indicated, each writer's metadata is saved as part of the backup operation. The metadata can be used to determine whether the restore is related to a shadow copy backup operation. If the backup copy was generated from a shadow copy (virtual volume), the shadow copy service illustrated in FIG. 2 is involved in the recover or restore operation.

7. Exemplary Computing Systems

The present invention extends to both methods and systems for backing up data. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system including a server that backs up data of one or more clients, a method for backing up data of a client, the method comprising:

identifying a set of backup groupings associated with a client, each backup grouping including one or more writers and one or more writer components;

selecting one or more writer components from at least one backup grouping selected from the set of backup groupings;

identifying a dependency of one of the selected one or more writer components, wherein the dependency comprises another writer component that was not included in the selected one or more writer components; and selecting the dependency for backup with the selected one or more writers.

2. A method as defined in claim 1, further comprising informing a user of the dependency of one of the selected one or more writer components.

3. A method as defined in claim 1, further comprising allowing the dependency to be deselected by a user.

4. A method as defined in claim 1, further comprising performing a backup of the selected one or more writer components and the dependency.

5. A method as defined in claim 1 further comprising communicating with a service operating at the client to identify the one or more writers included in each backup grouping.

6. A method as defined in claim 1, wherein selecting one or more writer components from at least one backup grouping selected from the set of backup groupings further comprises determining a selectability of the one or more writer components within the one or more writers.

7. A method as defined in claim 1, further comprising providing a visual indication to a user that conveys whether a particular writer or a particular writer component is individually selectable for backup or recovery.

8. A computer readable medium having computer executable instructions for performing the method of claim 1, wherein the computer readable medium comprises at least one of RAM, ROM, EEPROM, CD-ROM, optical disk storage, or magnetic disk storage.

9. In a system including a server that enables the data of one or more clients to be backed up and recovered, a method for backing up or recovering an application that has a dependency on another application, the method comprising:

displaying a user interface to a user that includes backup groupings of a client, wherein some of the backup groupings include at least one writer component in at least one writer;

providing a visual representation for each writer component in the user interface to indicate whether each writer component is individually selectable;

receiving input from the user to select one or more writer components in the backup groupings, wherein corresponding writers are also selected;

determining whether each of the selected one or more writer components has a dependency, wherein the dependency comprises another writer component that not directly associated with the selected one or more writer components;

selecting each dependency for backup with the selected one or more writer components.

10. A method as defined in claim 9, wherein displaying a user interface to a user that includes backup groupings of a client further comprises identifying active writers on the client.

11. A method as defined in claim 9, wherein displaying a user interface to a user that includes backup groupings of a client further comprises displaying backup groupings that do not include a writer.

12. A method as defined in claim 9, wherein determining whether each of the selected one or more writer components has a dependency further comprises notifying the user that a particular selected writer component has a dependency.

13. A method as defined in claim 12, further comprising enabling the user to deselect the dependency.

14. A method as defined in claim 9, further comprising performing a backup of the selected one or more writer components in the backup groupings.

15. A method as defined in claim 14, further comprising:

processing the selected writers including the selected one or more writer components in preparation for taking a snapshot of the client;

causing a snapshot of the client to be created such that the backup of the selected writers can be performed using the snapshot; and causing the deletion of the snapshot after the backup is completed for the selected one or more writers.

16. A method as defined in claim 9, further comprising providing a visual representation in the user interface that identifies each dependency of the selected one or more writer components.

17. A computer readable medium having computer executable instructions for performing the method of claim 9, wherein the computer readable medium comprises at least one of RAM, ROM, EEPROM, CD-ROM, optical disk storage, or magnetic disk storage.

18. In a system including a server that enables the data of one or more clients to be backed up and recovered, a method for recovering an application that has a dependency on another application, the method comprising:

displaying a user interface to a user that includes backup groupings of a client, wherein some of the backup groupings include at least one writer and at least one writer component;

receiving input from the user to at least partially select one or more writer components for recovery;

determining whether the selected one or more writer components have a dependency, wherein the dependency includes another writer component; and recovering the selected one or more writer components and the dependency to the client.

19. A method as defined in claim 18, further comprising providing a visual representation for each writer in the user interface to indicate whether each writer and each writer component is individually selectable for recovery, wherein a writer or a writer component individually selectable for recovery may not be individually selectable for backup.

20. A method as defined in claim 18, further comprising receiving input to select writer components included in the one or more writers.

21. A method as defined in claim 18, further comprising allowing the user to deselect the dependency such that the dependency is not recovered with the selected one or more writer components.

22. A method as defined in claim 18, wherein determining whether the selected one or more writer components have a dependency on other writers further comprises notifying the user of the dependency of the selected one or more writer components on other writer components.

23. A method as defined in claim 22, further comprising automatically selecting the dependency for recovery.

24. A computer readable medium having computer executable instructions for performing the method of claim 18, wherein the computer readable medium comprises at least one of RAM, ROM, EEPROM, CD-ROM, optical disk storage, or magnetic disk storage.

25. In a system including a server that backs up and recovers data of one or more clients, a method for backing up or recovering data of a client, the method comprising:

identifying writers that are included in a set of backup groupings associated with a client, wherein some of the writers include one or more writer components;

selecting one or more writer components for backup or recovery;

preventing one or more dependencies associated with the selected one or more writer components from being backed up or recovered, wherein the one or more dependencies are not required to preserve a state of the selected one or more writer components and wherein the one or more dependencies comprise additional writer components; and backing up or recovering the selected one or more writer components.

26. A method as defined in claim 25, further comprising receiving input from a user that disables the one or more dependencies from being selected for backup.

27. A method as defined in claim 26, further comprising receiving the input from a command line for backup.

28. A method as defined in claim 25, further comprising allowing a user to disable the one or more dependencies through a graphical user interface for an ad hoc backup.

29. A method as defined in claim 25, further comprising configuring the client from the server to disable at least one of the one or more dependencies for a scheduled backup.

30. A method as defined in claim 25, further comprising allowing a user to manually select the one or more dependencies for backup or recovery.

31. A method as defined in claim 25 wherein preventing one or more dependencies associated with the selected one or more writer components from being backed up or recovered further comprises deselecting at least one of the one or more dependencies selected for recovery.

32. A method as defined in claim 31, further comprising receiving input from a command line to deselect the at least one of the one or more dependencies for recovery.

* * * * *